United States Patent [19]

Kirschner

[11] Patent Number: 5,145,132
[45] Date of Patent: Sep. 8, 1992

[54] ADJUSTABLE LOAD BOLT ADAPTER BRACKET ASSEMBLY

[75] Inventor: Kraig A. Kirschner, Corona, Calif.

[73] Assignee: Automatic Fire Control Incorporated, El Monte, Calif.

[*] Notice: The portion of the term of this patent subsequent to Apr. 16, 2008 has been disclaimed.

[21] Appl. No.: 654,277

[22] Filed: Feb. 12, 1991

Related U.S. Application Data

[63] Continuation-in-part of Ser. No. 558,077, Jul. 25, 1990, Pat. No. 5,007,603, which is a continuation-in-part of Ser. No. 537,907, Jun. 11, 1990, Pat. No. 5,004,193.

[51] Int. Cl.$^5$ .................................................. F16L 3/00
[52] U.S. Cl. ........................................... 248/59; 248/62; 248/224.4; 403/381
[58] Field of Search .................. 248/59, 62, 65, 73, 248/74.1, 74.4, 214, 58, 72, 313, 230, 354.3, 223.4, 224.4, 291; 403/381, 118

[56] References Cited

U.S. PATENT DOCUMENTS

| | | | |
|---|---|---|---|
| 2,725,210 | 11/1955 | Swartz | 403/118 X |
| 3,570,794 | 3/1971 | Kirschner | 248/62 X |
| 3,669,391 | 6/1972 | Suozzo | 248/58 X |
| 3,700,202 | 10/1972 | Donnels | 248/354.3 |
| 4,596,105 | 6/1986 | Farmer | 403/381 X |
| 4,652,170 | 3/1987 | Lew | 403/381 |
| 4,697,770 | 10/1987 | Kirschner | 248/62 |
| 4,862,634 | 10/1989 | Gillaspy et al. | 248/354.3 |
| 5,004,193 | 4/1991 | Kirschner | 248/59 |
| 5,007,603 | 4/1991 | Kirschner | 248/59 |

Primary Examiner—Ramon O. Ramirez
Attorney, Agent, or Firm—Lyon & Lyon

[57] ABSTRACT

An adjustable load bolt adapter bracket assembly for use with a sway brace in securing a bracing element between a fluid pipeline and a structure to anchor the pipeline to the structure and limit relative movement therebetween. The assembly comprises an attachment member and an adapter plate. The attachment member includes a flat plate portion having an upstanding lateral wall adjacent one end thereof, at least one fastener receiving aperture therein, a bracing element receiving member pivotedly mounted on the lateral end wall and a plurality of locking channels in the opposite sides and one end thereof. The adapter plate defines a plurality of spaced fastener receiving apertures axially aligned therein and a locking tab extending from one side thereof and one end thereof. Alternative, the locking channels can be provided in one end and one side of the adapter plate and the locking tabs in the opposite ends of the plate portion of the attachment member. By selectively disposing one of the locking tabs within one of the locking channels, the plate is interlocked with the attachment member for increasing the available fastener receiving apertures for use in securing the bracing element to a fixed structure to increase the strength of the securement to meet different seismic codes and the footprint of the interlocked elements can be varied to fit on the available space on the fixed structure to which the bracket assembly is to be secured.

12 Claims, 3 Drawing Sheets

ADJUSTABLE LOAD BOLT ADAPTER BRACKET ASSEMBLY

This is a continuation-in-part of application, Ser. No. 558,077 filed Jul. 25, 1990 and entitled Adjustable Load Bolt Adapter Bracket Assembly now U.S. Pat. No. 5,007,603 which is a continuation-in-part of application, Ser. No. 537,907 filed Jun. 11, 1990 and entitled Adjustable Load Bolt Adapter Assembly now U.S. Pat. No. 5,004,193.

BACKGROUND OF THE INVENTION

The present invention relates to an adjustable load bolt adapter bracket assembly particularly adapted for use with a sway brace in securing a bracing element between a fluid pipeline and a fixed structure to anchor the pipeline to the structure. Sway braces are commonly used in building structures for securing numerous types of fluid supply lines to the structure to brace the lines against damaging movement such as could result from a seismic disturbance. An example of such a sway brace is found in U.S. Pat. No. 4,697,770. As seen therein, the sway brace secures a fluid supply line to a joist or other building structure by means of an elongated tubular bracing member which is held adjacent one of its ends by the sway brace and is fasten at its other end to the joist by a pair of bolts or other approved fastening members.

Recent changes in building codes have required additional securement of the bracing member to the structure. This has been achieved through the use of an adapter plate having three fastener receiving apertures therein. The plate is positioned over the mounting bracket by which the bracing member is secured to the structure or, in the case of the above patented structure, over the flattened end of the bracing element, such that two of the apertures in the plate are aligned with the apertures in the bracket, leaving the third aperture in the plate in axial alignment with the super imposed apertures of the plate end bracket. Through this configuration three bolts or other securement fasteners can be used to secure the bracing member to the building structure, increasing the strength of the attachment. Alternatively, an adapter plate having four apertures can be employed with the bracket to provide two additional fastener receiving apertures for applications requiring even additional attachment support.

While the use of such adapter plates has heretofore satisfied code requirements, they are subject to relative movement with respect to the brackets in the event of eccentric loading during a seismic disturbance due to the lack of any positive engagement between the plates and the bracket. In addition, such plates are configured so as to extend from the rearward end of the mounting bracket. As the building joists or other fixed members to which the mounting bracket and adapter plate are to be secured are often somewhat narrow and angularly disposed with respect to the central axis of the mounting bracket when the bracket is positioned thereon, there can be insufficient surface area to accommodate the rearwardly projecting bracket. The load bolt adapter bracket assembly of the present invention not only provides the positive engagement between the bracket and plate lacking in the adapter plate/mounting bracket combinations heretofore available, but allows for both extended and lateral parallel mounting of the adapter plate with respect to the mounting bracket to provide a variable footprint and thus better accommodate the available mounting space on the joist or other mounting surface while continuing to minimize any relevant movement between the mounting bracket and plate in the event of a seismic disturbance.

SUMMARY OF THE INVENTION

The present invention comprises an adjustable load bolt adapter bracket assembly for use in securing a bracing element to a fixed structure. The assembly is particularly adapted for use with a sway brace and a elongated bracing element for securing a fluid pipeline to a structure to prevent relative movement between the pipeline and structure in the event of a seismic disturbance. The assembly includes an attachment member for engaging one end of the bracing element and an adapter plate which interlocks and cooperates with the attachment member to secure the bracing element in place. The attachment member includes a flat plate portion which is adapted to abut a flat surface of the structure and defines one or more fastener receiving apertures therein and a plurality of locking tab recesses in the side walls thereof. The adapter plate defines a plurality of axially aligned fastener receiving apertures therein and a locking tab projecting from each of two perpendicularly disposed side walls thereof. By selectively disposing the adapter plate adjacent the plate portion of the attachment member such that one of the locking tabs is received within one of the locking tab recesses, the adapter plate can be interlocked with the attachment member in a plurality of adjacent dispositions to increase the number of available fastener receiving apertures for use in securing the attachment member to a fixed structure, thereby selectively increasing the strength of the securement to meet the structural requirements of the particular application, while allowing for adjustment in the footprint of the entire bracket assembly to fit on the available mounting space on the fixed structure to which the attachment member is to be secured.

In alternative embodiments of the invention the locking tabs can be provided on the ends of the flat plate portion of the attachment member and the locking tab recesses in two perpendicularly disposed side walls of the adapter plate. Additionally, the side wall surfaces of the locking tabs and locking tab recesses can be tapered or partially tapered so that at least a portion of the side wall about the locking tab recesses is disposed over a mating portion of the locking tab to further increase the securement of the bracing element.

It is the principal object of the present invention to provide an improved load bolt adapter bracket assembly for use with a sway brace in securing a bracing element between a fluid pipeline and a structure to anchor the pipeline to the structure and limit relative movement therebetween.

It is another object of the present invention to provide a load bolt adapter bracket assembly for use in securing a bracing element to a fixed structure which can selectively accommodate either one, two, three or four fastening members for securing the bracket to the structure to meet different structural strength attachment requirements without having to maintain an inventory of differently sized adapter plates.

It is yet another object of the present invention to provide an adjustable load bolt adapter bracket assembly for use in securing a bracing element to a fixed structure which provides a positive engagement between the components of the assembly to prevent relative movement between said components upon the assembly being subjected to an eccentric loading.

It is a still further object of the present invention to provide a load bolt adapter bracket assembly which allows for substantial variations in the footprint of the assembly to fit on the available mounting surfaces of a fixed structure while continuing to maintain a positive engagement between the components of the assembly.

These and other objects and advantages of the present invention will become readily apparent from the following detail description taken in conjunction with the accompanying drawings.

DESCRIPTION OF THE PREFERRED EMBODIMENT IN THE DRAWINGS

Figure 1:
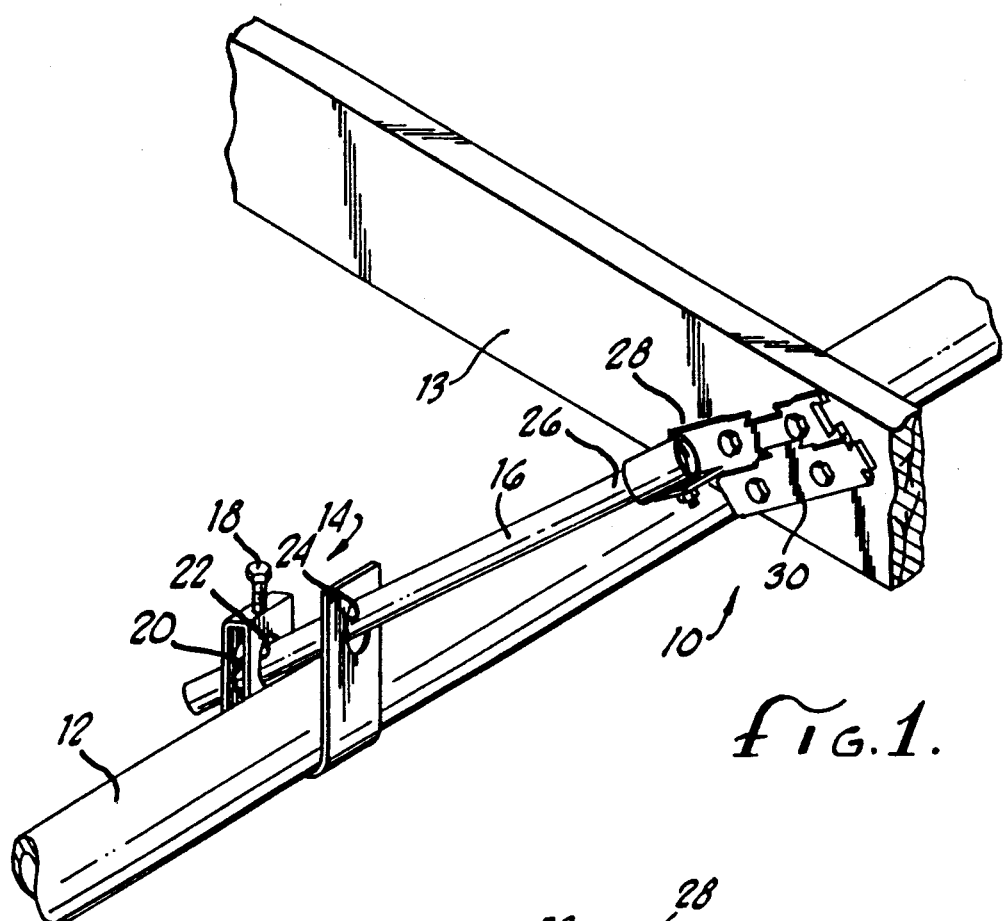
FIG. 1 is a perspective view of the adjustable load bolt adapter bracket assembly of the present invention in use with a sway brace and bracing element to secure a pipeline to a building joist wherein the attachment member and adapter plate are disposed in interlocked parallel alignment.
Figure 2:
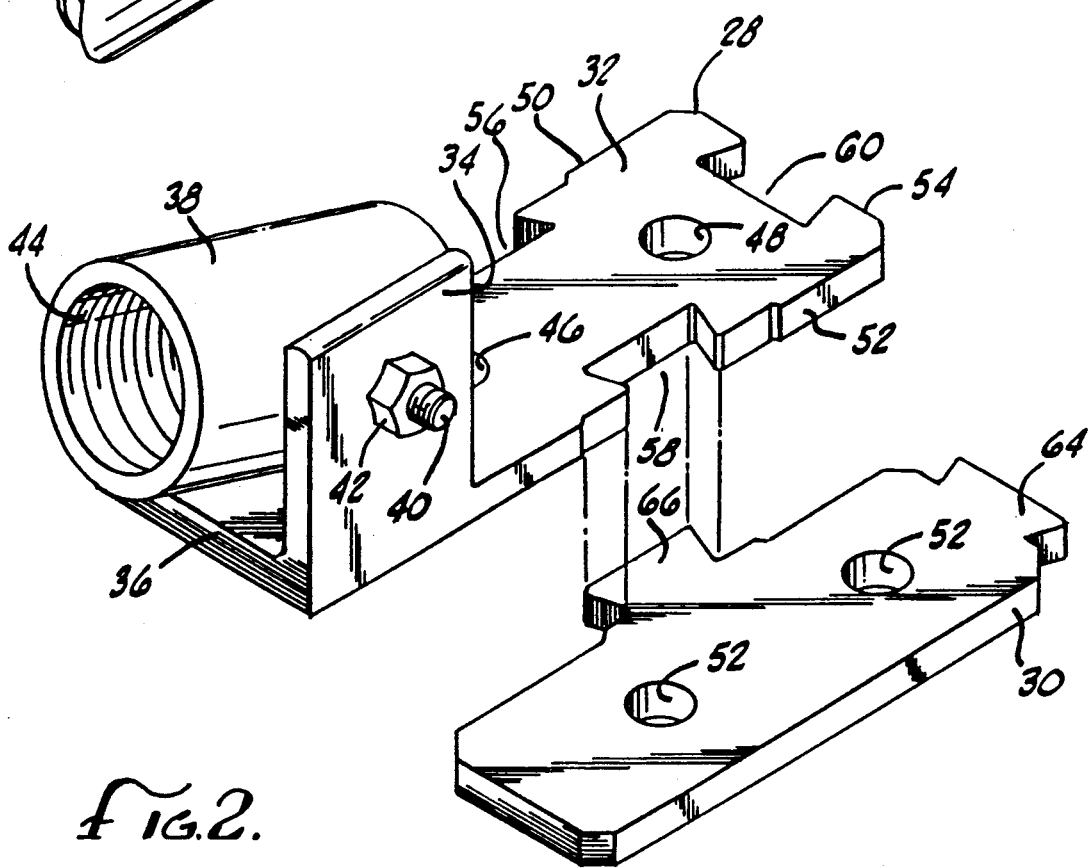
FIG. 2 is an enlarged perspective view of the bracket assembly of the present invention.

Referring now in detail to the drawings, FIG. 1 illustrates the use of the bracket assembly 10 of the present invention to secure a water pipe 12 to a building joist 13 by means of a sway brace 14 and ridged bracing element 16. As seen therein, the sway brace 14 ridgedly secures the bracing element 16 to the water pipe 12 by means of a bolt member 18 and the perimeter walls of aligned apertures 20, 22 and 24 in the sway brace. The operation of sway brace 14 is described in detail in U.S. Pat. No. 4,697,770. The ridged bracing element 16 is preferably defined by cylindrical metal pipe provided with external threads adjacent the extended end 26 thereof.

The bracket assembly 10 comprises an attachment member 28 and adapter plate 30. The attachment member 28 is preferably constructed steel and is about 3/16-¼ inch in thickness and defines a flat metal plate portion 32 having an upstanding lateral wall 34 adjacent end 36 thereof. A cylindrical bracing element receiving member 38 is pivotedly mounted on lateral wall 34 by means of a suitable bolt 40 and nut 42 and is provided with internal threads 44 adapted to mate with the external threads adjacent end 26 of the bracing element 16 so as to ridgedly secure the extended end of the bracing element 16 to the attachment member 28. The flat plate portion 32 of attachment member 28 defines a pair of spaced axially aligned fastener receiving apertures 46 and 48 therein, while sides 50 and 52 and rearward 54 of the plate portion 32 define tapered locking tab receiving channels 56, 58 and 60 therein.

The adapter plate 30, also preferably constructed of 3/16-¼ inch steel, is preferably flat and defines a pair of fastener receiving apertures 52 disposed along the central longitudinal axis thereof, a first wedge-shaped locking tab 64 projecting from one end thereof and a second similarly configured locking tab 66 projecting from one of the side walls of plate 30. In use, the attachment member 28 can be employed without the adapter plate 30 when only two fastening members are needed to provide the necessary securement of the attachment member 28 and bracing element 16 to the joist 13. If greater securement is required for a particular application, as for example where larger piping is being supported or where building codes are more rigid, the adapter plate 30 is employed with the attachment member 28 to increase the member of available fastener receiving apertures from two to four. To anchor the adapter plate 30 to attachment member 28, one of the locking tabs 64 or 66 is disposed within one of the locking tab receiving channels 56, 58 or 60 in the attachment member, depending on the configuration of available space on the building joist to which the bracket assembly 10 is to be secured.

Figure 3:
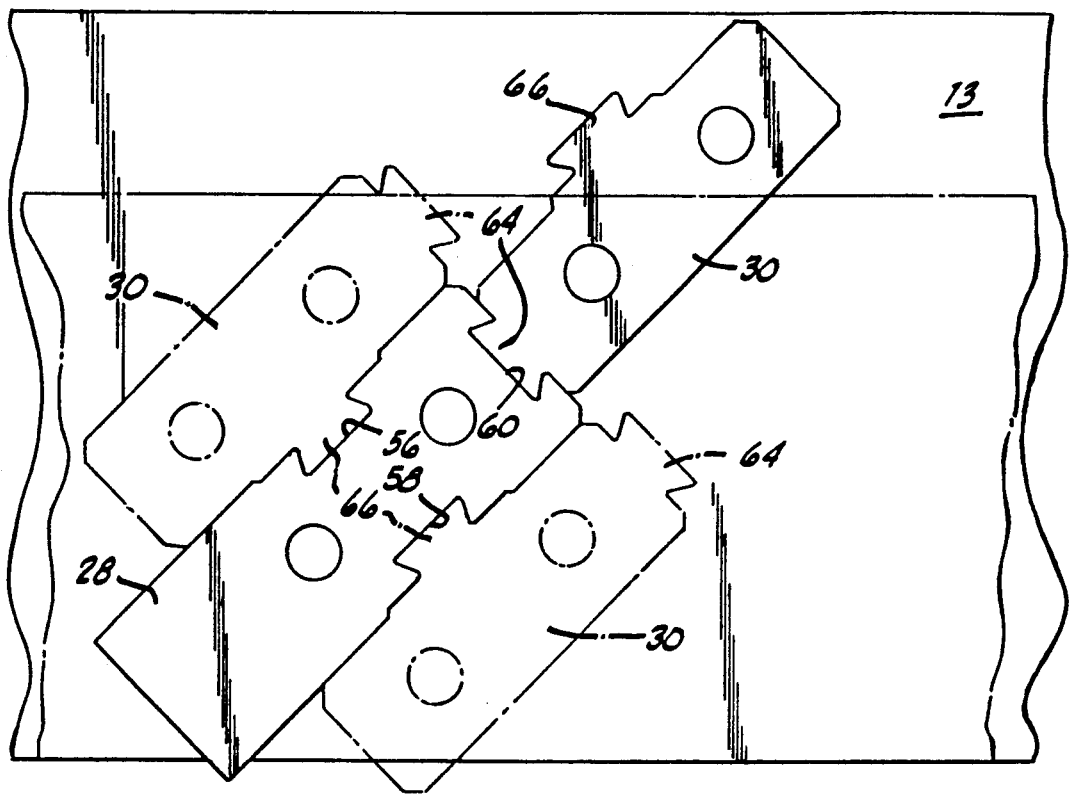
FIG. 3 is a plan view illustrating the different interlocked positions of the attachment member and adapter plate of the present invention.
Figure 4:
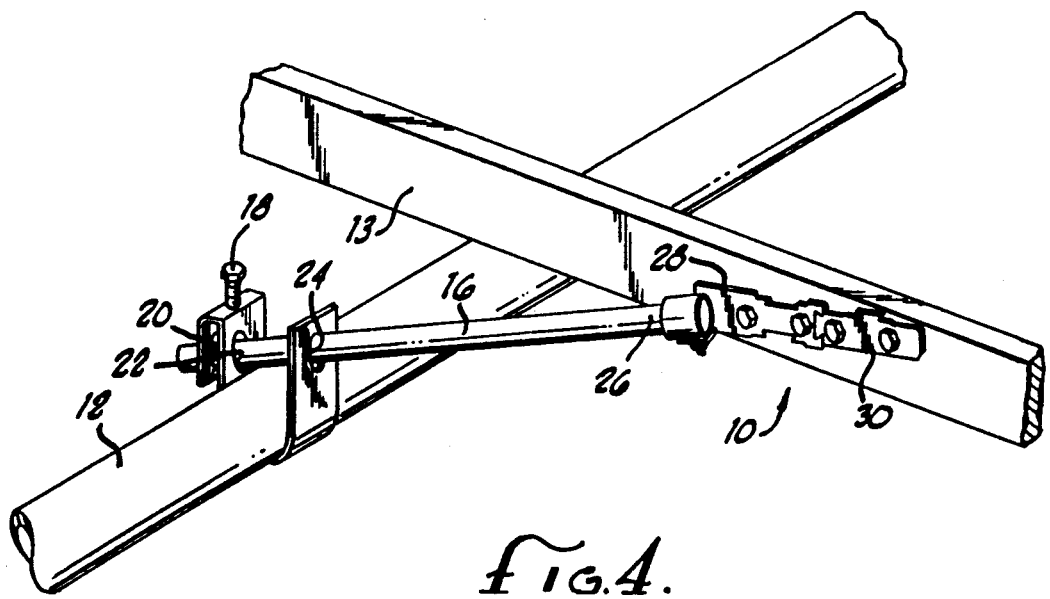
FIG. 4 is a perspective view of the bracket assembly of the present invention in use with a sway brace and bracing element to secure a pipeline to a building joist wherein the attachment member and adapter plate are disposed in interlocked axial alignment.

FIGS. 1 and 4 illustrate the adapter plate 30 being interlocked with the attachment member 28 in both parallel and axial alignments to fit the available mounting space on joist 13 while FIG. 3 illustrates the different footprints which the assembly 10 defines depending on relative positioning of the adapter plate 30 with respect to the attachment member 28. In each of the three different positions illustrated therein the interlocking of the adapter plate to the attachment member by means of the locking tabs prevents relative movement between the two components and minimizes the effect of any eccentric loading as may occur during a seismic disturbance. It should also be noted that, if desired for unusual installations, up to three adapter plates could be employed with a single attachment member.

Figure 5:
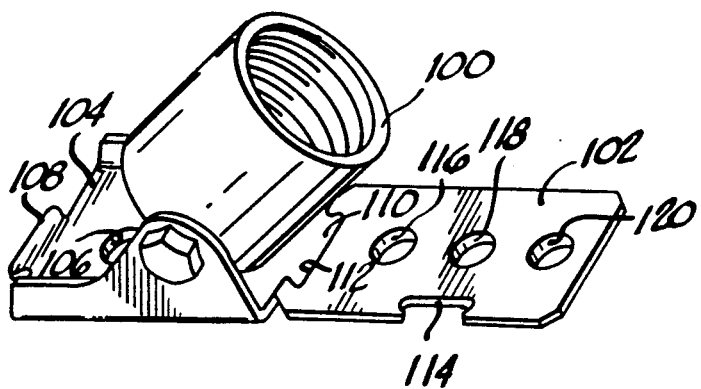
FIG. 5 is a perspective view of an alternate embodiment of the bracket assembly of the present invention showing the adapter plate mounted longitudinally.
Figure 6:
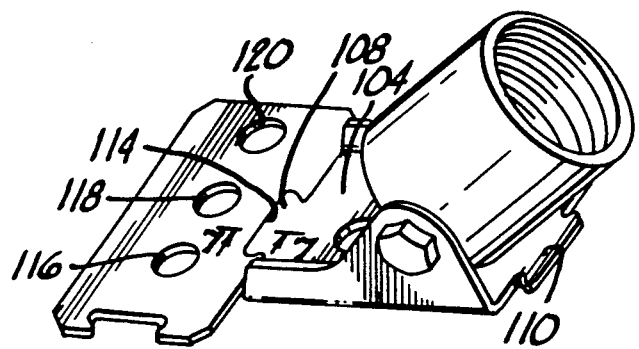
FIG. 6 is a perspective view of the alternate embodiment of the present invention showing the adapter plate mounted transversely.
Figure 7:
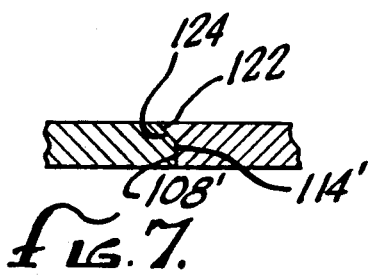
FIG. 7 is a sectional view taken along line 6—6 in FIG. 6.

FIGS. 5-7 illustrate an alternate embodiment of the invention comprising an attachment member 100 and adapter plate 102. The attachment member 100 is quite similar to the attachment member 28 of the prior embodiment except that the flat plate portion 104 thereof defines a single fastener receiving aperture 106 therein and two wedge shaped locking tabs 108 and 110 projecting from the ends thereof. Locking tabs 108 and 110 are adapted to be received in one of the locking tabs securing channels 112 and 114 formed in the side and end walls of the adapter plate 102 to provide the desired interlocking configuration of the attachment member 100 and adapter plate 102. Adapter plate 102 also defines three axially aligned fastener receiving apertures 116, 118 and 120 therein for securement of the plate to the building joist. Depending on the space available and/or the number of fasteners needed for a particular application, the adaptor plate 102 can be mounted longitudinally with respect to the attachment member 100 as seen in FIG. 5 or transversely with respect thereto as seen in FIG. 6.

As illustrated in FIG. 7, the upper portions of side walls 108' and 110' of locking tabs 108 and 110 are inclined at an angle of about 5° to mate with the similarly inclined upper portions of side walls 112' and 114' of the receiving channels 112 and 114 so that in the inner locked position, the inclined portion 122 of the side walls of one of the receiving channels abuts and extends over the inclined portion 124 of one of the locking tabs. By tapering the side walls of the locking tabs and receiving channels to provide such a mating overlap, the securement afforded by the adapter plate 112 is enhanced. This slight incline in the upper portion of side walls 108′, 110′, 112′ and 114′ is achieved in the manufacturing process in which the plate portion 106 of the attachment member 100 and the adapter plate 102 are formed from flat stock by being punched vertically in a die and sheared in at a slight angle to provide the inclination of the upper portion of the side walls illustrated in FIG. 7. If desired, the entire length of the side walls of the locking tabs and receiving channels could be cut at an angle to achieve the desired overlapping relationship. It should be noted that this same overlapping relationship could be employed in the prior embodiment of the invention illustrated in FIGS. 1–4. The use and function of the second embodiment of the invention is otherwise the same as in the prior embodiment.

Various changes and modifications may be made in carrying out the present invention without departing from the spirit and scope thereof. Insofar as these changes and modifications are within the purview of the appended claims, they are to be considered as part of the present invention.

I claim:

1. An adjustable bracket assembly for selective use with a varying number of fasteners to secure a bracing element to a fixed structure, said assembly comprising:
    an attachment member having means thereon for engaging a bracing element and defining a flat plate portion extending from said means, said plate portion having at least one fastener receiving apertures therein and a locking tab securing channel formed in opposite sides and one end of said plate portion; and
    an adapter plate for cooperation with said attachment member to provide additional fastener receiving apertures for the securement of the bracing element to the structure, said plate defining a plurality of axially aligned fastening receiving apertures therein, a first locking tab extending from one end thereof and a second locking tab extending from one side thereof, one of said tabs being adapted to be received within one of said channels for interlocking said adapter plate with said attachment member in a selected disposition adjacent thereto whereby the number of available fastener receiving apertures for use in securing the bracing element to the fixed structure can be increased by the number of fastener receiving apertures in said adapter plate and the footprint defined by said attachment member and interlocked adapter plate can be varied to fit the available space on a fixed structure.

2. The assembly of claim 1 wherein said engaging means on said attachment member comprises an upstanding sidewall portion integrally formed with said flat plate portion and a cylindrical member defining internal threads therein adapted to receive and threadably engage the bracing element, said cylindrical member being pivotedly mounted on said upstanding wall portion.

3. An adjustable bracket assembly for selective use with a varying number of fasteners to secure a bracing element to a fixed structure, said assembly comprising:
    an attachment member having means thereon for engaging a bracing element and defining a flat plate portion secured to said means, said plate portion defining first and second ends and having at least one fastener receiving aperture disposed therein between said ends and defining ay least one locking tab extending from one of said ends of said plate portion; and
    an adapter plate for cooperation with said attachment member to provide additional fastening receiving apertures for the securement of the bracing element to the structure, said plate defining a plurality of axially aligned fastener receiving apertures therein, a first locking tab securing channel in one end thereof and a second locking tab secureing channel in one side thereof, one of said locking tab securing channels being adapted to receive said locking tabs therein for interlocking said adapter plate with said attachment member in a selected disposition adjacent thereto whereby the number of available receiving apertures for use in securing the bracing element to the fixed structure can be increased by the fastener receiving apertures in said adapter plate and the footprint defined by said attachment member and interlocked adapter plate can be varied to fit the available space on a fixed structure.

4. The assembly of claim 3 including a second locking tab extending form the other of said ends of said plate portion.

5. The assembly of claims 3 or 4 wherein said engaging means on said attachment member comprises an upstanding side wall portion integrally formed with said flat plate portion and a cylindrical member defining internal threads therein adapted to receive and threadably engage the bracing element, said cylindrical member being pivotedly mounted on said upstanding wall portion.

6. The assembly of either claims 4 wherein said channels define inwardly tapered wall portions and said locking tabs are configured to be received within said channels and retained by said tapered wall portions.

7. The assembly of either claims 1, 3 or 4 wherein said plate portion of said attachment member and said adapter plate define inclined surfaces extending about the perimeters of said locking tabs and receiving channels such that upon disposing one of said locking tabs within one of said securing channels, the inclined surface extending about the perimeter of the securing channel abuts and extends over the inclined surface of the locking tab for holding said attachment member against the fixed structure.

8. The assemblies of claim 7 wherein said engaging means on said attachment member comprises an upstanding side wall portion integrally formed with said flat plate portion and cylindrical member defining internal threads therein adapted to receive and threadably engage the bracing element, said cylindrical member being pivotedly mounted on said upstanding wall portion.

9. The assemblies of claim 8 wherein said channels define inwardly tapered wall portions including said tapered surfaces extending about the perimeter thereof and said locking tabs are configured to be received within said channels and retained therein by said inwardly tapered wall portions.

10. An adjustable bracket assembly for selective use with a varying number of fasteners to secure a bracing element to a fixed structure, said assembly comprising:
    an attachment member having means thereon for engaging a bracing element and defining a flat plate portion secured to said means, said plate portion defining first and second ends, at least one fastener receiving aperture disposed therein between said end, a pair of axially aligned tapered locking tabs, one of said tabs extending from each of said ends of said plate portion and inclined abutment surfaces disposed on and extending about the perimeter of said tabs; and an adapter plate for cooperation with said attachment member to provide additional fastening receiving apertures for the securement of the bracing element to the structure, said plate defining a plurality of axially aligned fastener receiving apertures therein, a first tapered locking tab securing channel in one end thereof, a second locking tab receiving channel in one side thereof, and inclined abutment surfaces extending about said channels, one of said locking tab securing channels being adapted to receive one of said locking tabs therein such that said inclined surface extending about said securing channel abuts and mates with the inclined surface on said locking tab for interlocking said adapter plate with said attachment member in a selected disposition adjacent thereto and holding said attachment member against a fixed structure whereby the number of available receiving apertures for use in securing the bracing element to the fixed structure can be increased by the fastener receiving apertures in said adapter plate and the footprint defined by said attachment member and interlocked adapter plate can be varied to fit the available space on a fixed structure.

11. An adjustable bracket assembly for selective use with a varying number of fasteners to secure a bracing element to a fixed structure, said assembly comprising:
an attachment member including a flat plate portion, an upstanding side wall, a cylindrical member defining internal threads therein adapted to receive and threadably engage a bracing element, said cylindrical member being pivotedly mounted on said upstanding wall portion, a pair of axially aligned locking tabs having inwardly tapered opposite wall portions extending from the ends of said flat plate portion, and a fastener receiving aperture disposed in said flat plate portion axially aligned with said locking tabs; and an adapter plate for cooperation with said attachment member to provide additional fastener receiving apertures for the securement of the bracing element to the structure, said plate defining a plurality of axially aligned fastener receiving apertures therein, a first locking tab receiving channel disposed in one side thereof and a second locking tab receiving channel disposed in one end thereof, said channels being configured to receive therein in a mating relationship one of said locking tabs for interlocking said adapter plate with said attachment member in a selected disposition adjacent thereto whereby the number of fastener receiving apertures for use in securing a bracing element to a fixed structure can be increased and the footprint defined by said attachment member and said interlocked adapter plate can be varied to fit the available space on the fixed structure.

12. The assembly of claim 11 wherein said adapter plate defines inclined wall portions extending about the perimeter of said securing channels therein and said plate portion of said attachment member define correspondingly tapered wall portions extending about the perimeter of said locking tabs such that upon disposing one of said locking tabs within one of said securing channels, the inclined wall portion of the securing channel abuts and extends over the inclined wall portion of the locking tab for holding the attachment member against the fixed structure.

* * * * *